United States Patent
Stapert et al.

(10) Patent No.: US 6,172,167 B1
(45) Date of Patent: Jan. 9, 2001

(54) COPOLY(ESTER-AMIDES) AND COPOLY(ESTER-URETHANES)

(75) Inventors: Hendrik Roelof Stapert, Apeldoorn; Pieter Jan Dijkstra, Borne; Jan Feijen, Hengelo, all of (NL)

(73) Assignee: Universiteit Twente (NL)

( * ) Notice: Under 35 U.S.C. 154(b), the term of this patent shall be extended for 0 days.

(21) Appl. No.: 09/214,091

(22) PCT Filed: Jun. 27, 1997

(86) PCT No.: PCT/NL97/00368

§ 371 Date: Jul. 21, 1999

§ 102(e) Date: Jul. 21, 1999

(87) PCT Pub. No.: WO98/00454

PCT Pub. Date: Jan. 8, 1998

(30) Foreign Application Priority Data

Jun. 28, 1996  (NL) .................................................... 1003459

(51) Int. Cl.⁷ ......................... C08F 283/00; C08G 69/26
(52) U.S. Cl. ..................... 525/420; 528/335; 528/337; 528/339; 528/354; 528/361; 525/424; 525/425; 525/450; 525/452; 525/454; 525/462; 525/540
(58) Field of Search ..................... 528/335, 337, 528/339, 354, 361; 525/420, 424, 425, 450, 452, 454, 462, 540

(56) References Cited

U.S. PATENT DOCUMENTS

| | | | |
|---|---|---|---|
| 4,267,288 | * 5/1981 | Burkhart et al. | 525/438 |
| 4,281,077 | * 7/1981 | Hirzy | 525/129 |
| 4,343,743 | 8/1982 | Coquard et al. | 260/404.5 |
| 4,343,931 | 8/1982 | Barrows | 528/291 |
| 4,529,792 | 7/1985 | Barrows | 528/291 |
| 4,883,854 | 11/1989 | Coury et al. | 528/28 |

FOREIGN PATENT DOCUMENTS

| | | |
|---|---|---|
| 2165354 | 6/1996 | (CA) . |
| 4234305 | 4/1994 | (DE) . |
| 4327024 | 2/1995 | (DE) . |
| 0030822 | 6/1981 | (EP) . |
| 0030904 | 6/1981 | (EP) . |
| 0280815 | 9/1988 | (EP) . |
| 0717064 | 6/1996 | (EP) . |
| 54-119593 | 9/1979 | (JP) . |
| 54-119594 | 9/1979 | (JP) . |

OTHER PUBLICATIONS

Shaul M. Aharoni, "Hydrogen–Bonded Highly Regular Strictly Alternating Aliphatic–Aromatic Liquid–Crystalline Poly (ester amides)", Macromolecules (1988), 21, pp. 1941–1961.

Ioannis Arvanitoyannis et al., "Synthesis and study of novel biodegradable oligo (ester amide)s based on sebacic acid, octadecanedioic acid, 1,6–hexanediamine and ∈–caprolactone:2", Polymer, vol. 36, No. 4, (1995) pp. 857–866.

Antoinette van Bennekom, "Fast Crystallizing Polyesteramides", (1995), CIP–Data Koninklijke Bibliotheek, Den Haag.

Peter Serrano, "Alternating Polyesteramides Based on 1,4–Butylene Terephthalamide", (1996), CIP–Data Koninklijke Bibliotheek, Den Haag.

* cited by examiner

Primary Examiner—Samuel A. Acquah
(74) Attorney, Agent, or Firm—Webb Ziesenheim Logsdon Orkin & Hanson, P.C.

(57) ABSTRACT

The invention provide biodegradable copolymers of the copoly(ester-amide) or copoly(ester-urethane) type, which copolymers consist of building blocks with the general structure (I): [CB-VB] wherein CB and VB of different building blocks may be the same or different, and CB represents a block with a constant length and VB represents a block with a variable length.

23 Claims, 1 Drawing Sheet

FIG. 1

COPOLY(ESTER-AMIDES) AND COPOLY (ESTER-URETHANES)

The present invention relates to new biologically degradable aliphatic copolymers of the polyesteramide or polyesterurethane type. The invention further relates to monomers from which the copolymers are built up, a method for preparing the copolymers and products which can be manufactured from the new copolymers.

There is a very wide variety of (co)polymers. Depending on their application, they have a great diversity of properties. Especially the mechanical properties are of particular importance for the use of (co)polymers in end products. At the moment however, one other property is also becoming increasingly important from an environmental viewpoint. Because plastics are used on very large scale, they cause an enormous waste problem. There is therefore increasingly a preference for (biologically) degradable plastics.

Aliphatic polyesters are known. Most of these are low melting (Tm=50–70° C.) with insufficient mechanical properties for the manufacture of end products. The good biological degradability of this class of materials is known.

Aliphatic polyamides (nylon) are known as high-melting materials with good mechanical properties. Their biological degradability is however not described, except for a few copolyamides such as the alternating copoly(amide) of glycine and ε-caprolactam and copolymers of nylon-6,6 and glycine.

Aliphatic polyester amides and polyester urethanes are in principle also known. They can be manufactured via diverse routes from polyesters and polyamides or from their monomers, for instance by ester-amide exchange reactions, by polycondensation of oligoamide prepolymers with oligoester prepolymers, by combined ring opening and polycondensation, by successive ring opening of lactones and lactams or by polyaddition of a polyester-diacid and a diisocyanate, or by ring opening of morpholinediones.

The materials from this class exhibit a wide diversity of properties. However, many of the above mentioned polyester-amides do not possess, either the suitable, particularly mechanical, properties for the manufacture of end products.

Literature is available on the biological degradability of aliphatic oligo-polyesteramides. Arvanitoyannis, Nakayama, Kawasaki & Yamamoto (Polymer 36(4), 857–866 (1995)) describe that polyesteramides with a maximum of 50 mol % amide bonds are degradable. Polyesteramides with a high mol weight (Mn>10,000) were not synthesized.

There are however a number of patent publications concerning biologically degradable polyester-amides with a high mol weight. U.S. Pat. No. 4,343,931 and U.S. Pat. No. 4,529,792 relates to polyester-amides prepared from lactic acid, diamines and dicarboxylic acid dichlorides. JP-79/119593 and JP-79/119594 relate to polyester-amides manufactured from caprolactone and caprolactam. Both types of polyesteramides are however difficult to synthesize. Moreover, the obtained amide block length is not uniform and the average block length is known only by approximation or not at all. From DE-4.327.024 and DE-4.234.305 are known aliphatic polyester-amides which can be obtained via polycondensation of aliphatic diols, dicarboxylic acids and cyclic lactams, such as caprolactam. Of such polyesteramides, those with 30 to 70% by weight of amide structures and 70 to 30% by weight of ester structures are biologically degradable. The publication does not mention anything concerning the (average) amide block length in the polymer or the morphology of these polymers.

Aliphatic polyester-urethanes can in principle be manufactured by polyaddition of an aliphatic polyester-diol prepolymer and an aliphatic diisocyanate. A chain extender is often added, such as a diamine- or diol-, in order to obtain the required mol weight. It is known that the degree of elasticity and the degree of stiffness of the polyesterurethanes can be varied. On the morphology of the aliphatic polyester-urethanes little has been written however, particularly concerning the role of phase separation in relation to uniform urethane block length. It is however known that some polyester-urethanes are biologically degradable. In the manufacture of these polyester-urethanes an environmentally unfriendly diisocyanate is usually used.

It can be seen from the foregoing that for the known (co)polymers good mechanical properties (comparable to polyethylene and polypropylene), (biological) degradability and an environmentally friendly method of preparation do not go together. It is therefore the object of the invention to provide new aliphatic copolymers which do combine these properties.

According to the present invention it has now been found that from symmetrical, crystalline diamide-diols or diamide-diacids as well as from symmetrical, crystalline diurethane-diols respectively copolyesteramides and copolyesterurethanes can be manufactured in simple and efficient manner. The diamide-diols, diamide-diacids and diurethane-diols are herein the primary monomers which are copolymerized with a secondary monomer. "Secondary monomer" here designates one or more monomers or prepolymers. The primary monomers herein form blocks with a constant chain length, which are to a great extent responsible for the final properties of the copolymer.

According to the invention new copolymers are therefore provided with the general formula:

I

Wherein CB is a symmetrical constant block and VB is a variable block, which are mutually linked by an ester or anhydride bond. The definitions for the variable and constant blocks are given in claim 1.

The copolymers are therefore built up from a chain of building blocks, which each in turn consist per copolymer of a block with a fixed chemical structure and therefore a constant block length (designated hereinafter "constant block") and a block with a variable chemical structure and block length (designated hereinafter "variable block").

Figure 1:
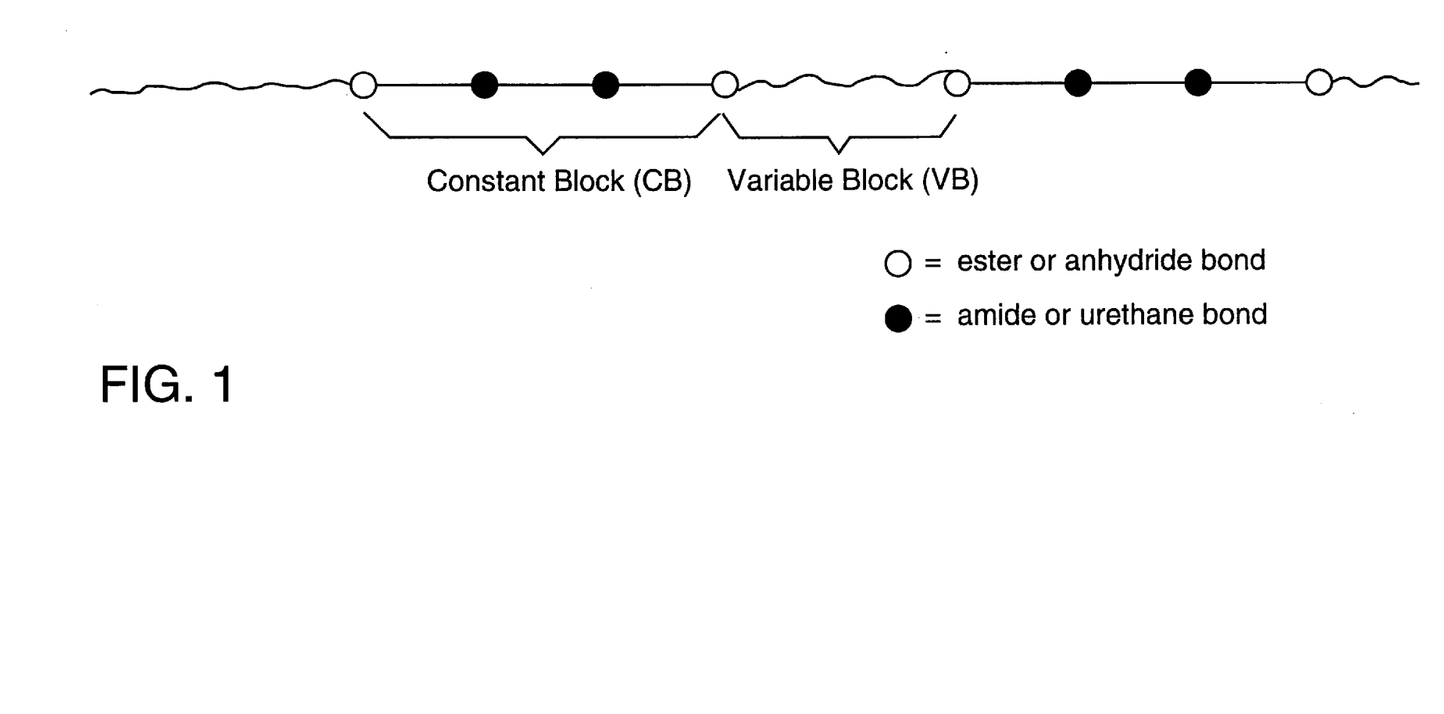
FIG. 1 illustrates schematically the structure of the copolymer according to the invention. Herein the blocks are mutually connected via an ester (or anhydride) bond.

The constant block is preferably an amide block or a urethane block. In the continuation of this application these terms may be used interchangeably.

Depending on the desired properties, one or more types of constant block may be used within one copolymer. Variation can thus occur in the variable blocks. That is, one or more types of variable block can be used per copolymer.

The amide blocks are randomly distributed over the polymer length and the uniform block length is retained during the polymerization. The uniformity of the urethane blocks can be disrupted by the occurrence of ester-urethane exchange reactions or by alcoholysis of the urethane block, which may result in longer urethane block lengths. The said reactions were however found under the reaction conditions to rapidly reach an (equilibrium) plateau value which corresponded with a maximum of 15% block of which the uniformity is lost.

The uniformity of the block length is important for a number of reasons. Uniformity of the block length induces a more rapid crystallization and gives better defined lamellae thicknesses of the crystalline phase (A. van Bennekom, University of Twente doctoral thesis, 1995; P. Serrano, University of Twente doctoral thesis, 1996). The two effects are particularly advantageous for a faster processing and for good mechanical properties, such as a high and constant Young's modulus over a wide temperature range and a good dimensional stability. These advantageous properties were attributed to a good phase separation and a rapid crystal nucleation and/or growth.

The block length itself is particularly important for the speed of biological degradation of the constant block. Biodegradability decreases with increased molecular weight and increases with increasing hydrophilicity. The amide and urethane blocks described in this application are short, contain only 2 amide or urethane bonds per unit, are usually water-soluble, are completely biologically degradable and display no toxicity.

The poly(ester-amides) usually display crystallinity and a high crystallization rate which is surprisingly high over a very large composition range of variable and constant blocks. When characterized with polarization microscopy with crossed polarizes, most polymers displayed a double refraction in the melt, combined with flow. This phenomenon is typical for liquid crystalline materials. It is however very unique for polymers with exclusively aliphatic, flexible chains to exhibit liquid crystalline behaviour. The only described example in the field of liquid crystalline semi-flexible poly(ester-amides) relates to fully alternating polyesteramides with the general structure: [C(O)N(H)—C$_6$H$_4$—C(O)O—(CH$_2$)$_y$—OC(O)—C$_6$H$_4$—N(H)C(O)—(CH$_2$)$_x$] (Aharoni, Macromolecules 1988, 21, 1941–1961). These polymers still have rigid aromatic groups. They conclude that the polymers have a smectic C or a disrupted smectic C morphology.

The polymers according to this invention are however completely aliphatic in character and are not limited to strictly alternating structure, but nevertheless display similarities to the observations of Ahoroni. It was also found that the liquid crystalline phase remained present up to very high temperatures—until the decomposition of the polymer—and it was also found possible to freeze the phase by rapid cooling from the melt.

Temperature-dependent Wide Angle X-ray Scattering (WAXS) showed the presence of order in the melt, thereby demonstrating that a smectic structure or a hexagonal columnar mesophase can be formed.

The poly(ester-urethanes) described in these inventions also display a double refraction under the polarization microscope, in the melt. They also display spontaneous flow at temperatures above 75° C. Most polymers are either not or little crystalline (have no clear melting point) but do display a liquid crystalline phase up to the decomposition temperature of the polymer.

The homopoly(esters) display no liquid crystalline behaviour, likewise the amide and urethane monomers (at normal pressure).

The invention relates not only to the new copolymers but relates also to the primary monomers from which the constant blocks are formed. The primary monomers are symmetrical, crystalline, water-soluble and have a chemical structure in one of the following three categories:

in which R, R', R", R''' and R'''' are the same or different and represent an H, hydrocarbyl or substituted hydrocarbyl or hydrocarbyl with protected O, N, and/or S functionality. This structure is further designated "diamide diol".

The mol weight of these monomers is preferably a minimum of (n=1 m=2; R—R""=H)=176 g/mol and a maximum of (n=15; m=12; R—R""=H)=685 g/mol for linear monomers without side groups of other hetero-atoms in the chain. Methyl side groups can for instance be included (R'=CH$_3$), as well as hetero-atoms in structure 1 such as for instance O.

This type of monomers can be manufactured by ring opening of lactones by a primary diamine, both in solution and in the melt, without external catalysts, as well as by condensation of a linear hydroxycarboxylic acid, or hydroxycarboxylic acid ester and a primary or secondary diamine. The possible lactones herein have the following general structure:

in which h is 2, 3, 4 or 5, i is 1 or 2, j is 1 or 2 and each R is an H or hydrocarbyl or substituted hydrocarbyl with protected O, N, and/or S functionality with a maximum of 30 carbon atoms. Preferred lactones are those in which R is hydrogen or methyl, and lactones which are particularly recommended are ε-caprolactone, δ-valerolactone, glycolide and lactides.

in which R, R', R", R'", R"" and R""' are the same or different and represent an H, hydrocarbyl or substituted hydrocarbyl with protected functionality, R""' is preferably not an H and n is preferably $\geq 4$. This structure is further designated "diamide-diacid".

The mol weight of these monomers is preferably a minimum of (n=m=2; R—R""=H)=260 g/mol and a maximum of (n=14; m=12; R—R""=H)=737 g/mol for linear monomers without side groups or other hetero-atoms in the chain. Methyl side groups can for instance be included (R'=$CH_3$), as well as hetero-atoms in structure 2, such as for instance O.

These monomers can be manufactured by ring opening of cyclic anhydrides by a primary diamine, both in solution and in the melt, without external catalysts, as well as by condensation of a linear diacid, preferably esterified (in excess) and diamine with external catalyst. The possible cyclic anhydrides herein have the following general structure:

in which l is 2, 3 or 4 and each $R_1$ and $R_2$ is an H or hydrocarbyl or substituted hydrocarbyl with protected O, N, and/or S functionality with a maximum of 30 carbon atoms.

in which R, R', R", R'" and R"" are the same or different and represent an H, hydrocarbyl or substituted hydrocarbyl with protected functionality. This structure is further designated "diurethane-diol".

The mol weight of these monomers is preferably a minimum of (n=m=2; R—R""=H)=236 g/mol and a maximum of (n=4; m=12; R—R""=H) 432 g/mol for linear monomers without side groups or other hetero-atoms in the chain. Methyl side groups can for instance be included ($R_1$=$CH_3$), as well as hetero-atoms in structure 3, such as for instance O.

These monomers can be manufactured by ring opening of cyclic carbonates by a primary diamine, both in solution and in the melt, without external catalysts, as well as by reaction of a primary diamine with a linear aliphatic carbonate with alcohol end groups. The possible cyclic carbonates herein have the following general structure:

in which k is 2, 3 or 4 and each $R_1$, $R_2$ is an H or hydrocarbyl or substituted hydrocarbyl with protected O, N, and/or S functionality with a maximum of 30 carbon atoms.

Preferred carbonates are those in which $R_1$, $R_2$ is hydrogen or methyl and particularly recommended are trimethylene carbonate, ethylene carbonate, propylene carbonate, tetramethylene carbonate and 2,2-dimethyl trimethylene carbonate.

It is also possible to make amide and urethane blocks with a plurality of reactive end groups. Use must be made herein of for instance cyclic dimers or the above mentioned cyclic lactones, cyclic anhydrides and cyclic carbonates. Two examples of such structures are:

5,5'-bis(oxepan-2-one) and spiro-bis-dimethylenecarbonate, (2,4,7,9-tetraoxa[5,5]undecane dione-(3,8))

The monomers according to the invention can be used as primary monomer in polycondensation with a wide range of possible co-reagents resulting in an extensive series of copolymers.

The diagram below gives a overview of the most important classes of polymers which can be manufactured by polycondensation with one of the above defined monomers in the categories 1, 2 and 3.

With the exception of the poly(amide-anhydrides) and the poly(esteramide-urethanes), the chemical structures of the above named polymers can be summarized in three formulae, each based on one of the monomers in the categories 1, 2 or 3.

The chemical structure of the materials is as follows:

1. poly(ester-amide)s on the basis of diamide-diol:
$[C(O)R_1C(O)OR_2O]_x$—$[C(O)R_{10}O]_y$—$[C(O)R_3C(O)OR_4C(O)N(R_6)R_6N(R_5)C(O)R_4O]_z$ 2. poly(ester-amide)s on the basis of diamide-diacid:
$[OR_2OC(O)R_1C(O)]_x$—$[OR_{10}C(O)]_y$—$[OR_7OC(O)R_6C(O)N(R_5)R_6N(R_5)C(O)R_8C(O)]_z$ 3. poly(ester-urethane)s on the basis of diurethane-diol:
$[C(O)R_1C(O)OR_2O]_x$—$[C(O)R_{10}O]_y$—$[C(O)R_3C(O)OR_9OC(O)N(R_5)R_6N(R_5)C(O)OR_8O]_z$ wherein:
- $R_3$ to $R_3$ and $R_5$, $R_7$ and $R_{20}$ are methylene groups $(CH_2)_n$ with n greater than or equal to 1; or are substituted methylene groups $(CR'R'')_n$ wherein R' and R'' represent an H, hydrocarbyl or substituted hydrocarbyl or hydrocarbyl with protected O, N and/or S functionality; or are $((CR'R'')_xQ(CR'R'')_y)_n$ with x and y greater than or equal to 1 and wherein Q represents a hetero-atom (O, N, S).
- $R_4$ is equal to the number of methylene groups and/or substituted methylene groups and optionally present hetero-atoms in the ring of the known stable lactones or $R_4$ is equal to the number of methylene groups or substituted methylene groups of the linear hydroxy acid. For instance: $R_4=(CH(CH_3))$ when lactide is used and when ε-caprolactone is used $R_4=(CH_2)_5$ and when 1,5-dioxepan-2-one is used $R_4=(CH_2)_2O(CH_2)_2$ or $R_4$ is equal to the number of methylene groups and/or substituted methylene groups and optionally present hetero-atoms of linear hydroxy carboxylic acids or hydroxy carboxylic acid esters
- $R_5$ is H or hydrocarbyl or substituted hydrocarbyl with protected functionality with a maximum of 30 carbon atoms
- $R_6$ is equal to the number of methylene groups and/or substituted methylene groups and optionally present hetero-atoms of the known stable cyclic anhydrides or of the used linear diacid or esterified diacid in the amide-diacid block
- $R_9$ is equal to the number of methylene groups or substituted methylene groups in the ring of known stable cyclic carbonates, such as ethylene carbonate and propylene carbonate. For instance: $R_9=(CH_2)_2$ when ethylene carbonate is used. $R_9$ is equal to half the number of methylene groups or substituted methylene groups of the linear carbonate.
- x, y, z represent the molar ratios and can each vary between 0 and 1, but x+y+z is always 1.

The above mentioned structure formulae are specific embodiments of the general formula as defined in claim 1.

The synthesis of the materials is a two-step procedure wherein in the first step the diamide-diol, diamide-diacid (ester) or diurethane-diol is prepared and purified.

The diamide diol for polymers from category 1 can be made, without having fully determined the optimal conditions, by ring opening of a lactone by a diamine in stoicheiometric ratio. This synthesis can be performed both in the melt and in solution and takes place with high yield and purity. The melting points of the monomers are dependent on the used diamine and lactone.

The diamide-diacid for polymers of category 2 can, without having fully determined the optimal conditions, be made in solution by ring opening of a cyclic anhydride by a diamine in stoicheiometric ratio, or by direct condensation in the melt of an excess of linear diacid or, preferably, dimethylester, with a diamine using a catalyst, for instance $Ti(OBu)_4$. The first route results in uniform diamide-diacid blocks in high yield and purity. Methylating of acid end groups can take place in 100% yield by direct esterification in acid environment. The second route also results in high yield. An additional purification to remove resulting longer blocks is necessary to obtain a uniform block length. Optimization of this procedure is as yet possible.

The diurethane-diol for polymers of category 3 can, without having fully determined the optimal conditions, be made in solution and in the melt by ring opening of a cyclic carbonate by a diamine in stoicheiometric ratio. High yield (99%) and purity (95%) are easily obtained. Higher purity (99%) can be obtained after washing or recrystallization.

The polymers are obtained in a second step by a standard melt-polycondensation procedure wherein in addition to the above stated monomers from the three categories, monomers, or mixtures hereof, are added from the following classes:

dialcohols such as ethylene glycol, 1,4-butanediol, 1,6-hexanediol, diethylene glycol and so on.

dicarboxylic acids, such as succinic acid, glutaric acid, adipic acid and so on, and preferably in the associated ester form.

hydroxy acids, such as $\epsilon$-hydroxy caproic acid, glycolic acid and so on, and preferably in the associated ester form.

lactones, such as $\epsilon$-caprolactone, glycolide and so on.

From these monomers the variable blocks are formed which alternate with the constant blocks in the final copolymer.

It is otherwise very well conceivable that by optimization a 1-step procedure can be developed wherein first a diamide or diurethane block is made from the correct monomers, whereafter the above mentioned monomers, mixtures thereof, or prepolymers (for instance oligoesterdiols) thereof, are added and the polycondensation thereof is started.

$^{13}$C- and $^1$H-NMR spectroscopy showed that the above mentioned poly(ester amide)s did indeed result after the polycondensation reaction. The uniform length of the constant block was substantially fully retained when the dicarboxylic acid was used in the esterified form. Some ($\pm$5–10 mol %) variation in the uniformity was found when dicarboxylic acids were used due to the occurrence of acidolysis of amide bonds. At the used synthesis temperatures (T=175° C.) substantially no esteramide exchange reactions were observed. Subject to the used reaction conditions and secondary monomers, the properties of the end product can be influenced. It lies within the scope of the skilled person to adjust the different parameters such that an optimum end product is obtained.

$^{13}$C- and $^3$H-NMR spectroscopy showed that in the case of the poly(ester-urethanes), longer urethane blocks may result due to urethane ester exchange or through alcoholysis of the urethane block. Said reactions were found to rapidly reach an (equilibrium) plateau value which corresponded to a maximum of 15% block of which the uniformity is lost.

The melt temperatures of the segmented poly(ester-amides) vary subject to the monomer composition between 50° C. and 160° C., and the glass transition temperature varies between –60° C. and 25° C. The crystallinity can be strongly controlled by the choice of the monomer or mixtures thereof. The polyester-amides display a very rapid crystallization. The segmented poly(ester-urethanes) are amorphous over a large composition range, i.e. they have no clear melting point, and display elastomeric properties. Polarization microscopy of polymers from categories 1 to 3 and temperature-dependent WAXS on a polymer of category 1 showed the presence of an ordered structure in the melt, which could be frozen by rapid cooling.

According to the invention copolymers with high mol weights (Mn>10,000 D (GPC, universal calibration in chloroform)) can be synthesized. The materials display good film- and fibre-forming properties and a great variety in strength, stiffness, elasticity and ductility, wherein the mol weight (Mn) preferably lies above 10,000 D.

The present invention will be further elucidated with reference to the following examples which, however, are given only by way of illustration and are not intended to limit the invention in any way. The products from the examples are biologically degradable (compostible).

EXAMPLES

Example 1

Synthesis of N,N'-1,4 butanediyl-bis[6-hydroxy hexanamide] (diamide-diol)

To a solution of 8.35 gram (0.0949 mol) 1,4-butanediamine in a mixture of 25 ml THF and 5 ml $H_2O$ was added a solution of 21.66 gram (0.1897 mol) $\epsilon$-caprolactone in 25 ml THF in 5 min. at room temperature while stirring. The reaction mixture was stirred for 16 hours, whereafter the solvent was evaporated under reduced pressure. The obtained crude product (light yellow oil) was dissolved in 150 ml methanol (p.a.) and brought to pH=11.5 by adding 1M NaOH. The obtained solution was stirred for 16 hours whereafter it was added slowly drop by drop to 500 ml THF (p.a.). The obtained white product was filtered off and dried. The product still contains crystallization water. Yield 70%; $T_m$=135–136° C. $C_{16}H_{32}N_2O_4$: C, H, N; calculated 60.71%, 10.20%, 8.86%; found 58.87%, 10.13%, 8.44%.

Example 2

Synthesis of N,N'-bis[5-carboxy-pentanoyl methyl ester]-butamethylene diamide (diamide-dimethyl) ester)

To 233.85 g dimethyl adipate (1.34 mol) was added 11.83 g (0.134 mol) 1,4-butane diamine. To the resulting mixture was added 0.1 g (0.2% by weight) Ti(OBu)$_4$. The mixture was stirred at 100° C. and the formed methanol was distilled off in 6 hours. The mixture was subsequently cooled wherein a white solid was formed. The white product was subsequently dissolved in chloroform. The obtained solution was filtered, whereafter the chloroform was evaporated under reduced pressure. The white product was dried at room temperature. Yield: 60%. $T_m$=143° C. $C_{18}H_{32}N_2O_6$: C, H, N; calculated, 58.03%, 8.66%, 7.52%; found, 58.05%, 8.72%, 7.29%.

Example 3

Synthesis of N,N'-bis[2-hydroxyethyl]-1,6 hexanedicarbamate (diurethane-diol)

A solution of 99.4 g (0.86 mol) 1,6-diaminohexane in 1 L THF (p.a.) was added drop by drop to a solution of 150.6 g (1.71 mol) ethylene carbonate in 1.5 L THF (p.a.). After 16 hours stirring at room temperature the THF was evaporated under reduced pressure. The obtained crude product was recrystallized from acetonitrile and dried. Yield: 95%. $T_m$=100° C. $C_{12}H_{24}N_2O_6$: C, H, N; calculated, 49.30%, 8.27%, 9.58%; found, 49.65%, 8.39%, 9.54%.

Example 4

Polyester-amide with 12.5 mol % N,N'-bis(capropyl)butanediamide Units 2.0345 g (0.012 mol) dimethyl adipate, 1.58 g (0.018 mol) 1,4-butanediol and 0.92 g (0.003 mol) N,N'-1,4 butanediyl-bis[6-hydroxy hexanamide] were weighed in a reaction vessel and placed under $N_2$. Added thereto was 0.1% by weight Ti(OBu)$_4$ dissolved in toluene. Methanol was distilled off at T=175° C., for 2 hours. A low vacuum was then applied (p=5 mbar) for 1 hour. After half an hour the temperature was raised to 185–190° C. At this temperature a high vacuum was applied (p=0.1 mbar) in order to remove the excess diol for 15–20 hours. The white-yellow viscous melt was cooled whereafter crystallization took place. Yield: 97%.

Example 5
Polyester-amide with 25 mol % N,N'-adipoyl-butanediamide Units

In a typical experiment 1.46 g (0.0084 mol) dimethyl adipate, 3.01 g (0.0333 mol) 1,4-butanediol and 3.11 g (0.0084 mol) N,N'-dimethyladipoly-butane diamide were weighed in a reaction vessel and placed under $N_2$. Added thereto was 0.1% by weight $Ti(OBu)_4$ dissolved in toluene. Methanol was distilled off at T=175° C., for 2 hours. A low vacuum was then applied (p=5 mbar) for 1 hour. After half an hour the temperature was increased to 185–190° C. At this temperature a high vacuum was applied (p=0.1 mbar) in order to remove the excess diol for 5–10 hours. The white-yellow viscous melt was cooled, whereafter crystallization took place. Yield: 97%.

Example 6
Polyester-urethane with 25 mol % N,N'-bis[2-hydroxyethyl]-1,6 hexanedicarbamate Units

2.54 g (0.008 mol) N,N'-bis(hydroxyethane)-hexane diurethane, 1.08 g (0.017 mol) 1,2-ethylene glycol and 3.031 g (0.017 mol) dimethyl adipate were weighed in a reaction vessel. Added to the mixture was 0.1% by weight $Ti(OBu)_4$ dissolved in toluene. The esterification reaction was performed at 175° C. under nitrogen, whereafter the reaction was continued at 175° C. and reduced pressure (p=0.1 mbar). After 5 to 7 hours a highly viscous mass is formed. Colour: white-brown. Yield: 80%.

What is claimed is:

1. Biologically degradable copolymers selected from the group consisting of copoly(esteramide) or copoly(esterurethane), which copolymers consist of building blocks with the following general structure:

wherein CB and VB of different building blocks may be the same or different, and CB represents a block with a constant length and the general formula:

wherein:
X may or may not be present and, if present, represents an oxygen;
$Z_1$ and $Z_2$ are the same or different and represent a group with the general formula:

wherein $x \geq 1$;
R' and R" are the same or different and represent an H, $CH_3$, hydrocarbyl or substituted hydrocarbyl with protected O, N, and/or S functionality;
p and q are different or the same and can each be $\geq 0$, assuming that $p+q \geq 1$, and Q is selected from the group consisting of hetero-atoms and hetero-atom-containing groups;
$R_1$ represents an H, —OH group or —COOH group; which group has reacted in the general formula I to an ester bond;
$R_2$ is hydrogen or hydrocarbyl or substituted hydrocarbyl with protected O, N, and/or S functionality with a maximum of 30 carbon atoms; and
VB represents a block with variable length, which block is formed by one or more monomers from the group which consists of alkanediacids, alkanediacid-chlorides, alkanediols, poly(alkane ether)diols, alkanediacid anhydrides, poly(alkane ether) diacidanhydrides, hydroxy acids (lactones), each of which can occur within one variable block in combination with one or more of the others and/or combination with a diisocyanate,
with the proviso that when CB is a diamidediol, VB does not have the general formula:

wherein $R^5$ is selected from the group consisting of linear or branched alkylene having 1 or 2 nonadjacent catenary oxygen or sulfur atoms, and alkenylene;
cycloalkylene and arylene having up to 25 carbon atoms in the cyclic compounds and from 2 to 25 carbon atoms in the non-cyclic, and a and b are independently zero or one.

2. Copolymer as claimed in claim 1, characterized in that CB is a block with the general structure:

wherein $n \leq 15$, $m \leq 12$, and R' and R" are substituted as defined in claim 1.

3. Copolymer as claimed in claim 1, characterized in that CB is a block with the general structure:

wherein $n \leq 14$, $m \leq 12$, and R' and R" are substituted defined in claim 1.

4. Copolymer as claimed in claim 1, characterized in that CB is a block with the general structure:

wherein n=1, 3 or 4, m<12, and R' and R" are substituted as defined in claim 1.

5. Copolymer as claimed in claim 1 to be obtained by a copolymerization reaction between two monomer compositions, wherein the first monomer composition comprises one or more CB blocks as defined in claim 1, and the second monomer composition comprises one or more VB blocks which are selected from the group consisting of alkanediacids, alkanediacidchlorides, alkanediols, poly (alkane ether)diols, alkanediacid anhydrides, poly(alkane ether) diacid-anhydrides and combinations thereof.

6. Copolymer as claimed in claim 5, characterized in that the first monomer composition comprises a diamide-diol and/or diamide-diacid and the second monomer composition is selected from the group consisting of an alkanediacid and an alkanediol, and the resulting copolymer is an alternating poly(esteramide).

7. Copolymer as claimed in claim 5, characterized in that the first monomer composition comprises a diamide-diol and the second monomer composition consists of an alkanediacid-chloride and the resulting copolymer is an alternating poly(esteramide).

8. Copolymer as claimed in claim 5, characterized in that the first monomer composition is a composition selected from the group consisting of a diamide-diol, a diamide-diacid, and a mixture thereof and the second monomer composition is a composition selected from the group consisting of an alkanediacid in combination with an alkanediol, an alkanediacid in combination with a poly(alkane ether) diol, and an alkanediacid in combination with a hydroxy acid and the resulting copolymer is a copoly(esteramide) or a copoly(ester-esteramide).

9. Copolymer as claimed in claim 5, characterized in that the first monomer composition is a composition selected from the group consisting of a diamide-diol, a diamide diacid, and a mixture thereof and the second monomer composition is a composition selected from the group consisting of a diisocyanate and an alkanediacid in combination with an alkanediol, a diisocyanate and an alkanediacid in combination with a poly(alkane ether)diol, and a diisocyanate and an alkanediacid in combination with a hydroxy acid and the resulting copolymer is a copoly(esteramide)urethane or a copoly(ether-esteramide)urethane.

10. Polymer as claimed in claim 5, characterized in that the first monomer composition comprises a diamide-diacidanhydride and the resulting polymer is a poly(amide-anhydride).

11. Copolymer as claimed in claim 5, characterized in that the first monomer composition comprises a diamide-diacidanhydride and the second monomer composition consists of an alkanediacidanhydride and the resulting copolymer is a copoly(amide-anhydride).

12. Copolymer as claimed in claim 5, characterized in that the first monomer composition comprises a diamide-diacidanhydride and the second monomer composition consists of an poly(alkane ether)diacid anhydride and the resulting copolymer is a copoly(amide-etheranhydride).

13. Copolymer as claimed in claim 5, characterized in that the first monomer composition comprises a diurethane-diol and the second monomer composition consists of an alkanediacid and the resulting copolymer is an alternating poly(esterurethane).

14. Copolymer as claimed in claim 5, characterized in that the first monomer composition comprises a diurethane-diol and the second monomer composition consists of an alkanediacid-chloride and the resulting copolymer is an alternating poly(esterurethane).

15. Copolymer as claimed in claim 5, characterized in that the first monomer composition comprises a diurethane-diol and the second monomer composition is a composition selected from the group consisting of an alkanediacid in combination with an alkanediol, an alkanediacid-chloride in combination with a poly(alkane ether)diol, an alkanediacid in combination with a hydroxy acid, an alkanediacid-chloride in combination with an alkanediol, an alkanediacid-chloride in combination with a poly(alkane ether)diol and an alkanediacid-chloride in combination with a hydroxy acid, and the resulting copolymer is selected from the group consisting of copoly(esterurethane) and copoly(ether-esterurethane).

16. Copolymer as claimed in claim 1, wherein one of the following monomers serves as first monomer composition: N,N'-1,4 butanediyl-bis[6-hydroxy hexanamide], N,N'-bis [5-carboxy pentanoyl methyl ester]-butamethylene diamide, N,N'-bis[2-hydroxyethyl]-1,6 hexanedicarbamate, and wherein the following monomers serve as second and third monomer composition: dimethyl adipate and 1,2 ethanediol or 1,4 butanediol.

17. Monomers with the general formula:

in which the variables are substituted as in claim 1.

18. Monomers as claimed in claim 17, characterized by the formula:

wherein $n \leq 15$, $m \leq 12$ and R' and R" are substituted as defined in claim 1.

19. Monomers as claimed in claim 17, characterized by the formula:

wherein $n \leq 14$, $m \leq 12$ and R' and R" are substituted as defined in claim 1.

20. Monomers as claimed in claim 17, characterized by the formula:

wherein $n \leq 4$, $m \leq 12$ and R' and R" are substituted as defined in claim 1.

21. Monomers as claimed in claim 17 for use in the manufacture of copoly(ester-amides) or copoly(ester-urethanes).

22. Method for manufacturing copolymers as claimed in claim 1, comprising of a copolymerization reaction between two monomer compositions, wherein the first monomer composition comprises one or more CB blocks as defined in claim 1 and the second monomer composition comprises one or more VB blocks which are selected from the group consisting of alkanediacids, alkanediacidchlorides, alkanediols, poly(alkane ether)diols, alkane acid anhydrides, hydroxy acids, lactones and combinations thereof.

23. Product comprising a copolymer as claimed in claim 1.

* * * * *

UNITED STATES PATENT AND TRADEMARK OFFICE
CERTIFICATE OF CORRECTION

PATENT NO. : 6,172,167 B1
DATED : January 9, 2001
INVENTOR(S) : Hendrik Roelof Stapert et al.

It is certified that error appears in the above-identified patent and that said Letters Patent is hereby corrected as shown below:

Title page,
Item [57] ABSTRACT,
Line 1, "provide" should read -- provides --.

Column 1,
Line 39, between "either" and "the suitable" insert -- intrinsically or through limitation of the mol weight, --.

Column 7,
Line 36, "($R_6$)" should read -- ($R_5$) --.
Line 42, "$OR_8O]_z$" should read -- $OR_9O]_z$ --.
Line 45, "$R_3$ to $R_3$" should read -- $R_1$ to $R_3$ --.
Line 45, " and $R_5$" should read -- and $R_6$ --.
Line 45, "$R_{20}$" should read -- $R_{10}$ --.

Column 8,
Line 29, "$R_6$ is equal" should read -- $R_8$ is equal --.

Column 9,
Line 49, "$^3$H-NMR" should read -- $^1$H-NMR --.

Column 10,
Line 34, after "-dimethyl" delete right parenthesis -- ) --.

Column 12,
Line 3, in claim 1, after "COOH group" delete semicolon (;) and insert comma (,).
Line 49, in claim 3, after "substituted" insert -- as --.

UNITED STATES PATENT AND TRADEMARK OFFICE
CERTIFICATE OF CORRECTION

PATENT NO. : 6,172,167 B1
DATED : January 9, 2001
INVENTOR(S) : Hendrik Roelof Stapert et al.

It is certified that error appears in the above-identified patent and that said Letters Patent is hereby corrected as shown below:

Column 13,
Line 47, in claim 12, "of an poly" should read -- of a poly --.

Column 14,
Line 5, in claim 16, "in claim 1" should read -- in claim 15 --.

Signed and Sealed this

Sixteenth Day of October, 2001

Attest:

*Nicholas P. Godici*

NICHOLAS P. GODICI
*Attesting Officer*     *Acting Director of the United States Patent and Trademark Office*